INVENTOR
WILFORD N. HANSEN
BY
ATTORNEY

INVENTOR.
WILFORD N. HANSEN

BY

ATTORNEY

United States Patent Office 3,420,138
Patented Jan. 7, 1969

3,420,138
VARIABLE ANGLE ATTENUATED TOTAL REFLECTION ATTACHMENT
Wilford N. Hansen, Thousand Oaks, Calif., assignor to North American Rockwell Corporation, a corporation of Delaware
Filed Sept. 17, 1964, Ser. No. 397,194
U.S. Cl. 356—246                                 3 Claims
Int. Cl. G01n *21/00;* G01j *3/00;* G01t *1/16*

ABSTRACT OF THE DISCLOSURE

An attenuated total reflection devices allows the angle of reflection of a light beam from a sample to be varied and maintains the total light path length the same for each angle of reflection. The device comprises a prism having one of its surfaces in contact with a sample and a pair of reflecting surfaces normal to each other and rotatable about a pivot point which lies on a line within the plane of the largest face of the prism. The largest face is positioned parallel to the light beam which is reflected from one mirror surface to one prism surface, to the other prism surface (sample surface) and back to the second mirror surface so that the incoming and exit light beams remain aligned.

---

Figure 1:
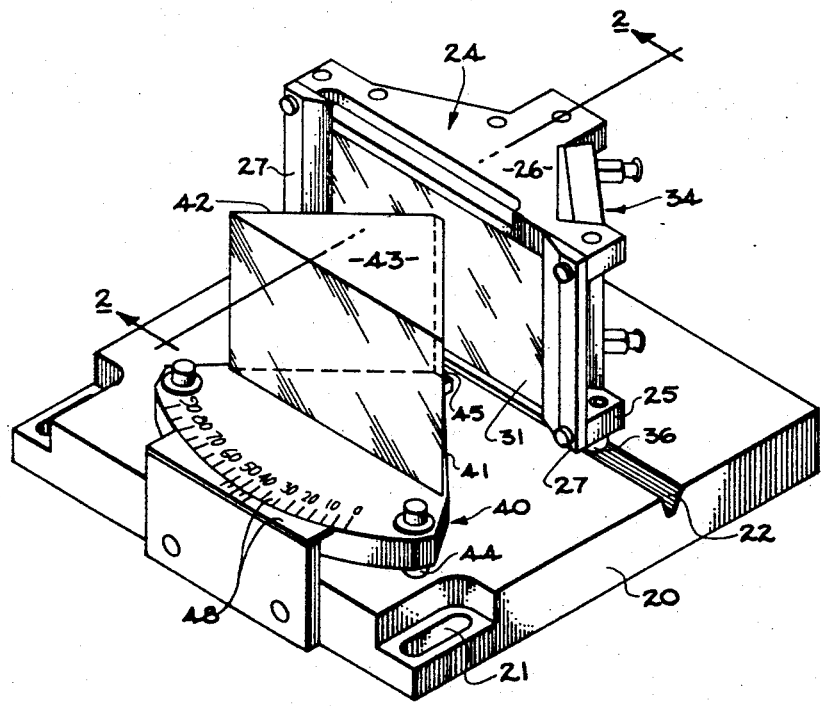

The present invention is directed to apparatus for the examination of reflection spectra and more particularly to a variable angle single reflection unit.

The variable angle reflection unit of the present invention may be utilized as an attenuated total reflection unit or for the measurement of reflectance at angles of incidence less than the critical angle. Attenuated total reflection utilizes the phenomenon that, under the condition of near total reflection at the interface between a highly refractive transparent medium and the electromagnetic radiation absorbing medium under investigation, such radiation incident on the reflecting interface actually enters the absorbing medium. The reflected radiation is attenuated by this minute penetration and provides a spectrum having absorption bands characteristic of the absorbing medium under investigation.

Prior art devices utilizing the attenuated total reflection technique or simple reflectance have generally required the use of multiple mirrors and lenses requiring precision alignment or have been limited in their use to single angle reflections. Examples of prior art attenuated total reflection devices may be found in Spectrochemica Acta, vol. 18, No. 9, p. 1108 (1962); Analytical Chemistry, vol. 36, p. 783, January 1964; and applicant's co-pending application Ser. No. 301,829, filed Aug. 13, 1963, entitled "Attenuated Total Reflection Device." Examples of prior art simple reflectance devices may be found in Journal of the Optical Society of America, vol. 41, No. 5, p. 366, May 1951.

The present invention is primarily directed to a variable angle reflection unit providing a single beam reflection from a sample under investigation which is particularly adapted for use in a double beam spectrometer. The devices of the present invention may be placed directly in the sample compartment of a standard spectrophotometer and provide a simple accurate means for varying the angle of reflection at the sample interface.

Another object of the present invention is to provide a variable angle reflection unit in which, when used with a spectrophotometer, the beam travel through air is equal for both beams of the instrument.

A further object of the present invention is to provide a simple, inexpensive variable angle reflection device in which the beam may be selectively moved along the interface of the sample without changing the beam path length.

A still further object of the present invention is to provide a simple, inexpensive variable angle reflection cell which requires no auxiliary focusing optics and which can be used for obtaining spectra of solids, liquids and other absorbing species in the ultra-violet, visible or infrared region.

Another object of the present invention is to provide a variable angle reflection cell for use in obtaining spectra of samples by the attenuated total single reflection technique in which no auxiliary precision optical systems are required for use in a spectrophotometer.

Figure 2:
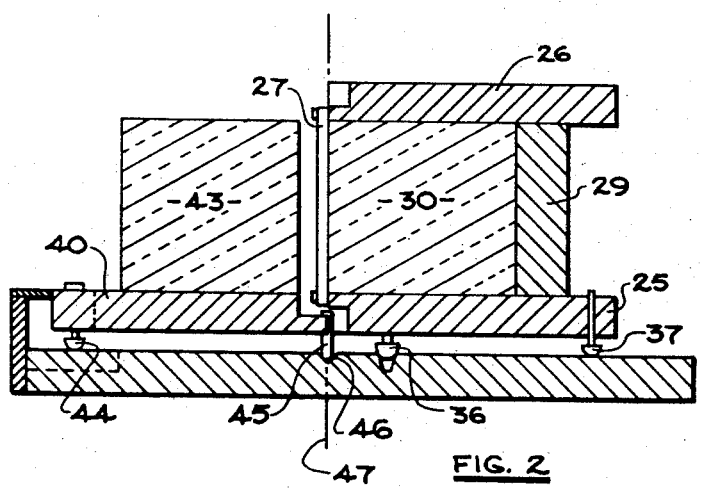
Figure 3:
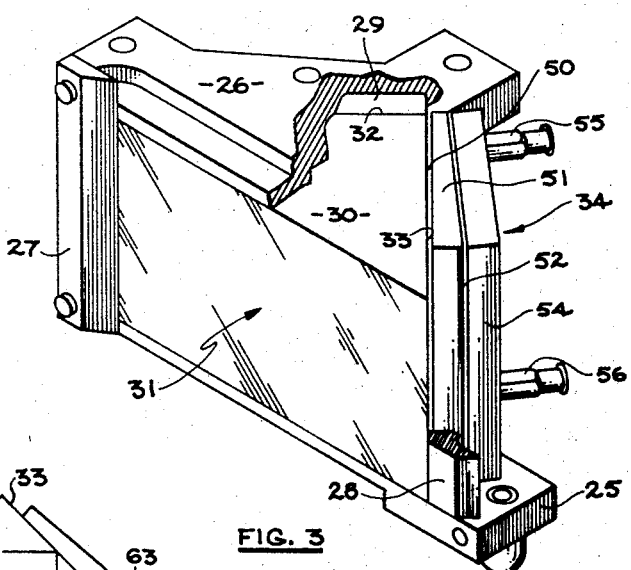

These and other objects of the present invention will become more apparent from the following detailed description of various embodiments of the present invention taken together with the drawings, hereby made a part thereof, in which:

FIG. 1 is a perspective view of one embodiment of the present invention;
FIG. 2 is a sectional view along lines 2—2 of FIG. 1;
FIG. 3 is a partial sectioned perspective view of a portion of FIG. 1; and
FIGS. 4A and 4B are schematic diagrams showing the optical paths of the embodiment of FIG. 1.

Referring now to the drawings in detail, FIG. 1 shows one embodiment of the present invention and comprises a base 20 having a pair of end slots 21 for mounting the base in the sample compartment of a spectrophotometer or other optical instrument and a longitudinal slot 22 oriented parallel to the light beam as described in detail hereinafter. A frame indicated generally at 24, having a bottom plate 25, top plate 26, a pair of prism aligning members 27 and 28 (see also FIG. 3) and face plate 29, holds a right angle prism 30 so that its front face 31 is preferably parallel to the longitudinal slot 22. One side 32 of the prism 30 is mirrored while the third side 33 is enclosed by a sample compartment indicated generally at 34 and hereinafter described in detail. Bottom plate 25 is provided with a pair of adjustable legs 36 located at opposite ends of plate 25 which are slidable in slot 22 and a third adjustable leg 37 (see FIG. 2) slidable on the top surface of base 20. In this manner the faces 31, 32 and 33 of prism 30 can be adjusted to maintain a perpendicular relationship with the top surface of base 20.

A rotatable base 40 is provided on which a pair of reflecting surfaces 41 and 42 are mounted in perpendicular relationship to each other. In the embodiment shown a right angle prism 43 with two reflecting surfaces is utilized. The base 40 has a pair of legs 44 movable in an arcuate path on the surface of base 20, and a pivot 45 (see FIG. 2) which is rotatable in indentation 46. The orientation is such that the center line 47 of the indentation 46, pivot 45, the apex of reflecting surfaces 41 and 42 and a line on the surface 31 of prism 30 coincide. The apex of the prism 43 is removed in FIG. 1 to eliminate physical contact between the prism 43 and surface 31.

Figure 4A:
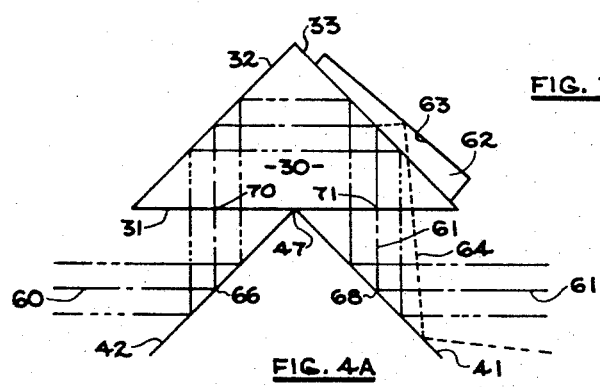
Figure 4B:
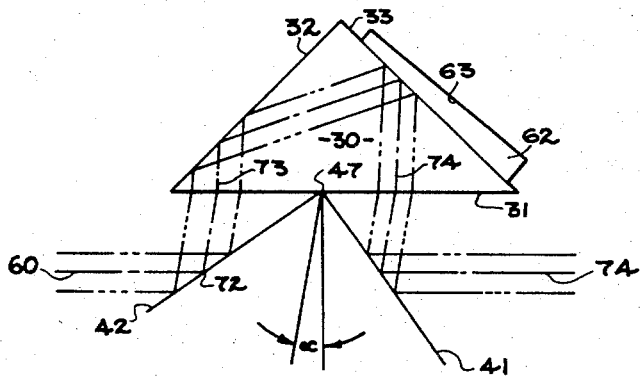

The arcuate edge of rotatable base 40 is preferably graduated to show the angle of reflection from the surface 33 of prism 30 and calibrated indicator 48 is provided, as will be more apparent from the description of FIGS. 4A and 4B.

At least a portion of the face 33 of prism 30 is surrounded by a frame gasket 50 (see FIG. 3) sealed to the surface 33. A wedge shaped frame 51 is sealed to gasket 50 and is adapted to contain a sample, e.g., liquid, which is in physical contact with the surface 33. A second gasket 52 is provided for sealing cover plate 54 to wedge frame 51 so that a sealed volume is formed within frame 51 into which a sample may be injected through aperture 55 and 56. Similar arrangements may be used for gas adsorbed on the surface of samples, or the sample compartment may be removed and a solid sample placed in optical contact with surface 33.

The frame 51 is preferably wedge shaped so that light which penetrates the sample within the volume of frame 51 will be reflected from the surface of cover plate 54 at an angle to the main beam. In this manner only the component of light reflected from the sample will be properly aligned with the subsequent optics of the spectrometer.

The operation of the preferred embodiment is shown diagramatically in FIGS. 4A and B. FIG. 4A shows the case when the first reflecting surface 42 is aligned at a 45° angle to the light beam 60 so that the beam is reflected normal to the surface 31 and no refraction at this surface takes place. The beam is reflected from reflecting surface 32 at an angle to sample surface 33 equal to the angle between surface 42 and the axis of the incoming light beam 60. The reflected beam 61 is normal to the surface 31 of prism 30 and is reflected by reflecting surface 41 along a path having as its axis the axis of the incoming light beam 60.

Light penetrating the sample 62 is reflected by the inner surface 63 of cover plate 54. However, since surface 63 is not parallel with sample surface 33 of prism 30 such light is separated from the beam 61 as indicated by dotted line 64. In this manner the reflected beam 61 does not contain light reflected from other than the sample 62.

The preferred embodiment which is adapted for use in a double beam spectrophotometer maintains the light path in air constant. This is apparent from FIG. 4A when it is considered that the distance between the point of first reflection 66 and the point of last reflection 68, as measured along the axes of beams 60 and 61 is exactly equal to the sum of the distances from reflecting points 66 and 68 to their respective points 70 and 71 on the surface 31 of prism 30. Thus, the light path in air for the preferred embodiment is identical to the path length in the second beam of a double beam spectrophotometer, and this is true for all angles of incidence as will be apparent from FIG. 4B.

Referring now to FIG. 4B, the reflecting surfaces 41 and 42 are shown rotated about their axis 47 by an angle α from a line normal to the surface 31 of prism 30. The incoming light beam 60 is reflected at point 72 at an angle to surface 31 so that the beam is refracted at surface 31 at an angle depending upon the index of refraction of the material of prism 30. The refracted beam 73 is reflected from reflecting surface 32 and the sample surface 33 at an angle directly related to the index of refraction of prism 30 and the angle α. The reflected beam 74 is again refracted at surface 31 and reflected by surface 41 along the axis of incoming beam 60.

The prism 30 is movable in the preferred embodiment in the slot 22 in a direction parallel to the axes of beams 60 and 74 so that the axis of beam 74 may be properly aligned with the axis beam 60. As shown in FIG. 4B the apex of surfaces 32 and 33 is displaced to the right of the apex of reflecting surfaces 41 and 42 to accomplish this alignment. It should also be noted that the distance traveled by the light beam in the environment surrounding the preferred embodiment as depicted in FIG. 4B is the same as though the device was not present, as explained above with respect to FIG. 4A.

Where the distance traveled by the light beam in the air or other environment is not an important factor, i.e., where the distance traveled by the two beams in a double beam spectrophotometer need not be maintained equal, various modifications may be made without affecting the operation of the device. For example, the slot 22, which in the preferred embodiment is parallel to the surface 31 and incidentally parallel to the light beam as described, need not be parallel to surface 31 so long as its movement includes a component which is parallel. Movement at an angle to the surface 31 has the effect of changing the distance traveled in air and may effect the focus. Further, under such less stringent experimental conditions, the center line of rotation of the normal reflecting surfaces 41 and 42 need not coincide with the surface 31 of prism 30.

It is equally clear that, while the preferred embodiment has been shown and described as utilizing right angle prisms having equal adjacent sides, other right angle prisms may be used or combinations of such prisms utilized. It is also apparent that for certain angles of incidence on prism surface 32 light will not be totally reflected by the prism face alone and a coating of highly reflective metal (not shown) may be utilized.

As is apparent from FIGS. 4A and B, the scale 48 (FIG. 1) will be linear in angle for simple specular reflection. However, because of refraction the angle of incidence at the sample surface will not be linear with scale reading. Graphs or special scale adapters may be utilized for each prism material if precisely known angles of incidence and reflections are required.

The sample, if liquid, will be in optical contact with the surface 33. However, for solid samples a flat surface should be provided and pressed against the prism face 33 or held in the plane that the prism face 33 occupies. Soft solids can easily be pressed against face 33.

The region occupied by prism 30 may be occupied by air or other gas or it may be made liquid tight with transparent front window and a liquid prism used having the sample as a container boundary. This contemplated arrangement would partially alleviate the problem of optical contact with hard solid samples especially in the UV-VIS-NIR spectral region where transparent liquids are easily found.

Another contemplated arrangement is the use of four planar reflecting surfaces, one of which is the sample, where the transparent phase within the unit is a liquid confined by an appropriate container having windows normal to the beam, so that no refraction takes place in the unit and the scale 48 indicates the angle of reflection directly.

The entire unit shown in FIG. 1 may also be moved in a direction normal to the light path, e.g., by utilizing slots 21. Such movement changes the region of the sample surface exposed to the light beam. Thus, a solid sample covering only a part of the sample face could be exposed to the beam, the unit moved and the reflection spectrum from the sample compared to total reflection.

It is also clear from FIGS. 4A and B that the prism 30 could be rotated about the pivot point 47 rather than rotate the reflecting surfaces 41 and 42. Thus, the rotatable base 40 would be provided for prism 30 and the longitudinal movement in slot 22 provided for the prism 43. However, in either case the entire unit would be movable in a direction normal to the light beam so that the beam reflected at the sample surface could be scanned along that surface while maintaining the angle of reflection constant.

The movement of prism 30 along slot 22 provides a simple and convenient means for aligning the incoming beam 60 and reflected beams 61 and 74 on a common axis without changing the angle of reflection.

Although particular embodiments of the present invention have ben described, various modifications will be apparent to those skilled in the art without departing from the scope of the invention. Therefore, the present invention is not limited to the specific embodiments disclosed but only by the appended claims.

I claim:
1. A variable angle reflection attachment comprising a first pair of plane reflecting surfaces supported normal to each other, the intersection of the planes of said surfaces defining a first axis, means for supporting said pair of surfaces for rotation about said axis, a triangular prism having a pair of plane faces normal to each other and having a third face, said faces forming parallel lines of intersection, said first axis lying within the plane surface formed by said third face, and means for supporting a sample in optical contact with at least one of said second pair of faces.

2. The attachment of claim 1 having an optical axis passing through said first pair of reflecting surfaces and including means for supporting said prism and said last named means for movement parallel to said optical axis.

3. The attachment of claim 1 having an optical axis passing through said first pair of reflecting surfaces and including means for supporting said pair of reflecting surfaces and said prism for movement in a direction normal to said optical axis.

References Cited

UNITED STATES PATENTS

| 3,240,111 | 3/1966 | Sherman et al. | 88—14 |
| 3,279,307 | 10/1966 | Wilks | 88—14 |
| 3,369,446 | 2/1968 | McCarthy | 88—14 |

OTHER REFERENCES

CIC Newsletter, Attenuated Total Reflection—A New Infrared Sampling Technique, September 1961, published by Connecticut Instrument Co., Wilton, Conn.

JEWELL H. PEDERSEN, *Primary Examiner.*

F. L. EVANS, *Assistant Examiner.*

U.S. Cl. X.R.

250—83.3